US 8,990,416 B2
Mar. 24, 2015

(12) United States Patent
Shukla et al.

(54) SUPPORT FOR A NEW INSERT STREAM (ISTREAM) OPERATION IN COMPLEX EVENT PROCESSING (CEP)

(75) Inventors: Vikram Shukla, Fremont, CA (US); Anand Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/102,665

(22) Filed: May 6, 2011

(65) Prior Publication Data

US 2012/0284420 A1    Nov. 8, 2012

(51) Int. Cl.
G06F 15/16    (2006.01)
G06F 17/30    (2006.01)

(52) U.S. Cl.
CPC .................. G06F 17/30516 (2013.01)
USPC ........................... 709/231; 709/224

(58) Field of Classification Search
CPC .................................. G06F 17/30516
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |

(Continued)

FOREIGN PATENT DOCUMENTS

| | | |
|---|---|---|
| EP | 1241589 A2 | 9/2002 |
| EP | 2474922 | 7/2012 |

(Continued)

OTHER PUBLICATIONS

"SQL Tutorial—In", Published on Feb. 16, 2009, Tizag.com, http://web.archive.org/web/20090216215219/http://www.tizag.com/sqlTutorial/sqlin.php, pp. 1-3.*

(Continued)

*Primary Examiner* — Hieu Hoang
*Assistant Examiner* — Nam Tran
(74) *Attorney, Agent, or Firm* — Kilpatrick Townsend and Stockton LLP

(57) ABSTRACT

One embodiment of the invention includes a method of processing streaming data. The method includes initializing a stream of data and setting a time interval to apply to the stream of data. The time interval comprises a window for analyzing the data within the stream of data. The method further includes identifying one or more columns within the stream of data, designating one or more of the columns to be monitored for differences within the data over the time interval, and monitoring the designated columns over the time interval. Further, the method includes determining that at least one value from at least one of the designated columns has changed and in response to at least one value changing, outputting the changed values from the designated columns.

20 Claims, 6 Drawing Sheets

(56) References Cited

U.S. PATENT DOCUMENTS

| | | |
|---|---|---|
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | March et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce |
| 7,634,501 B2 | 12/2009 | Yabloko |
| 7,636,703 B2 | 12/2009 | Taylor |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,134,184 B2 | 3/2012 | Becker et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,346,511 B2 | 1/2013 | Schoning et al. |
| 8,392,402 B2 | 3/2013 | Mihaila et al. |
| 8,447,744 B2 | 5/2013 | Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,775,412 B2 | 7/2014 | Day et al. |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin et al. |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |

(56) References Cited

U.S. PATENT DOCUMENTS

| | | |
|---|---|---|
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0154740 A1 | 7/2005 | Day |
| 2005/0174940 A1 | 8/2005 | Iny |
| 2005/0177579 A1 | 8/2005 | Blakeley et al. |
| 2005/0204340 A1 | 9/2005 | Ruminer et al. |
| 2005/0229158 A1 | 10/2005 | Thusoo et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156964 A1 | 7/2007 | Sistla |
| 2007/0192301 A1 | 8/2007 | Posner |
| 2007/0198479 A1 | 8/2007 | Cai et al. |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1* | 10/2008 | Moriwaki et al. .......... 704/270.1 |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0172014 A1 | 7/2009 | Huetter |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvonov |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0327102 A1 | 12/2009 | Maniar et al. |
| 2010/0017379 A1* | 1/2010 | Naibo et al. .......... 707/4 |
| 2010/0017380 A1 | 1/2010 | Naibo et al. |
| 2010/0023498 A1 | 1/2010 | Dettinger et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106946 A1 | 4/2010 | Imaki et al. |
| 2010/0125584 A1 | 5/2010 | Navas |
| 2010/0161589 A1 | 6/2010 | Nica et al. |
| 2010/0223305 A1 | 9/2010 | Park et al. |
| 2010/0223437 A1 | 9/2010 | Park et al. |

(56) References Cited

U.S. PATENT DOCUMENTS

| | | |
|---|---|---|
| 2010/0223606 A1 | 9/2010 | Park et al. |
| 2010/0312756 A1 | 12/2010 | Zhang et al. |
| 2010/0318652 A1 | 12/2010 | Samba |
| 2011/0004621 A1 | 1/2011 | Kelley et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | de Castro Alves et al. |
| 2011/0161328 A1 | 6/2011 | Park et al. |
| 2011/0161352 A1 | 6/2011 | de Castro Alves et al. |
| 2011/0161356 A1 | 6/2011 | de Castro Alves et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196891 A1 | 8/2011 | de Castro Alves et al. |
| 2011/0270879 A1 | 11/2011 | Srinivasan et al. |
| 2011/0302164 A1 | 12/2011 | Krishnamurthy et al. |
| 2011/0314019 A1 | 12/2011 | Jimenez Peris et al. |
| 2011/0321057 A1 | 12/2011 | Mejdrich et al. |
| 2012/0041934 A1 | 2/2012 | Srinivasan et al. |
| 2012/0130963 A1 | 5/2012 | Luo et al. |
| 2012/0166469 A1 | 6/2012 | Cammert et al. |
| 2012/0191697 A1 | 7/2012 | Sherman et al. |
| 2012/0259910 A1 | 10/2012 | Andrade et al. |
| 2012/0290715 A1 | 11/2012 | Dinger et al. |
| 2013/0144866 A1 | 6/2013 | Jerzak et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinavasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |

FOREIGN PATENT DOCUMENTS

| | | |
|---|---|---|
| WO | 00/49533 A2 | 8/2000 |
| WO | WO00/49533 | 8/2000 |
| WO | 0118712 | 3/2001 |
| WO | 01/59602 A2 | 8/2001 |
| WO | 01/65418 A2 | 9/2001 |
| WO | 03/030031 A2 | 4/2003 |
| WO | 2012050582 | 4/2012 |

OTHER PUBLICATIONS

Sansoterra "Empower SOL with Java User-Defined Functions," IT Jungle.com (Oct. 9, 2003).

Ullman et al., "Introduction to JDBC," Stanford University (2005).

Non-Final Office Action for U.S. Appl. No. 12/957,194 dated Dec. 7, 2012.

Non-Final Office Action for U.S. Appl. No. 13/089,556 dated Nov. 6, 2012.

Notice of Allowance for U.S. Appl. No. 12/534,398 dated Nov. 27, 2012.

Notice of Allowance for U.S. Appl. No. 12/506,905 dated Dec. 14, 2012.

Non-Final Office Action for U.S. Appl. No. 12/957,201 dated Dec. 19, 2012.

Office Action for U.S. Appl. No. 12/548,187 (Jun. 20, 2012).

Notice of Allowance for U.S. Appl. No. 12/395,871 (May 4, 2012).

Office Action for U.S. Appl. No. 12/548,222 (Jun. 20, 2012).

Office Action for U.S. Appl. No. 12/534,398 (Jun. 5, 2012).

Office Action for U.S. Appl. No. 12/548,281 (Jun. 20, 2012).

Office Action for U.S. Appl. No. 12/913,636 (Jun. 7, 2012).

Notice of Allowance for U.S. Appl. No. 12/874,197 (Jun. 22, 2012).

International Search Report for PCT/US2012/034970 (Jul. 16, 2012).

Esper Reference Documentation, Copyright 2009, ver. 3.1.0, 293 pages.

Final Office Action for U.S. Appl. No. 12/548,290 dated Jul. 30, 2012.

Office Action for U.S. Appl. No. 13/193,377 dated Aug. 23, 2012.

Office Action for U.S. Appl. No. 11/977,437 dated Aug. 3, 2012.

Final Office Action for U.S. Appl. No. 11/601,415 dated Jul. 2, 2012.

Notice of Allowance for U.S. Appl. No. 12/506,891 dated Jul. 25, 2012.

Final Office Action for U.S. Appl. No. 12/506,905 dated Aug. 9, 2012.

International Search Report dated Sep. 12, 2012 for PCT/US2012/036353.

Office Action for U.S. Appl. No. 13/396,464 dated Sep. 7, 2012.

Office Action for U.S. Appl. No. 13/244,272 dated Oct. 14, 2012.

Notice of Allowance for U.S. Appl. No. 12/548,209 dated Oct. 24, 2012.

Nah et al. "A Cluster-Based THO-Structured Scalable Approach for Location Information Systems," The Ninth IEEE International Workshop on Object-Oriented Real-Time Dependable Systems (WORDS'03), pp. 225-233 (Jan. 1, 2003).

Hulton et al. "Mining Time-Changing Data Streams," Proceedings of the Seventh ACM SIGKDD, pp. 10 (Aug. 2001).

Stump et al. (ed.) Proceedings of IJCAR '06 Workshop "PLPV '06: Programming Languages meets Program Verification," pp. 1-113 (Aug. 21, 2006).

Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).

Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).

Wu et al. "Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).

Final Office Action for U.S. Appl. No. 12/396,464 dated Jan. 16, 2013, 16 pages.

Final Office Action for U.S. Appl. No. 12/913,636 dated Jan. 8, 2013, 20 pages.

Non-Final Office Action for U.S. Appl. No. 12/949,081 dated Jan. 9, 2013, 12 pages.

Final Office Action for U.S. Appl. No. 12/193,377 dated Jan. 17, 2013, 24 pages.

Final Office Action for U.S. Appl. No. 12/534,384 dated Feb. 12, 2013, 13 pages.

Final Office Action for U.S. Appl. No. 13/107,742 dated Feb. 14, 2013, 15 pages.

Notice of Allowance for U.S. Appl. No. 11/977,437 dated Mar. 4, 2013. 9 pages.

Final Office Action for U.S. Appl. No. 13/244,272 dated Mar. 28, 2013, 29 pages.

Notice of Allowance for U.S. Appl. No. 12/957,194 dated Mar. 20, 2013. 9 pages.

(56) References Cited

OTHER PUBLICATIONS

U.S. Appl. No. 11/927,683, Notice of Allowance mailed on Nov. 9, 2011, 10 pages.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 pages.
U.S. Appl. No. 12/548,222, Non-Final Office Action mailed on Apr. 10, 2013, 16 pages.
U.S. Appl. No. 12/548,281, Non-Final Office Action mailed on Apr. 13, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
Oracle Database Data Cartridge Developers Guide, B28425-03, 11g Release 1 (11.1), Oracle, Mar. 2008, 372 pages.
"Complex Event Processing in the Real World," an Oracle White Paper, Sep. 2007, 13 pages.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
"Developing Applications with Weblogic Server," BEA WebLogic Server, Mar. 30, 2007, ver. 10.0, 254 pages.
"EPL Reference," BEA WebLogic Event Server, Jul. 2007, ver. 2.0, 82 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
"Getting Started with WebLogic Event Server," BEA WebLogic Event Server, Jul. 2007, ver. 2.0, 66 pages.
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
"Managing Server Startup and Shutdown," BEA WebLogic Server, Mar. 30, 2007, ver. 10.0, 134 pages.
"Matching Behavior," .NET Framework Developers Guide, pp. 1-2, Copyright 2008 Microsoft Corporation, downloaded Jul. 1, 2008 from URL: http://msdn.microsoft.com/en-us/library/Oyzc2yb0(printer).aspx.
"New Project Proposal for Row Pattern Recognition—Amendment to SQL with Application to Streaming Data Queries," H2-2008-027, H2 Teleconference Meeting, Jan. 9, 2008, pp. 1-6.
"Oracle CEP Getting Started," Release 11gR1 (11.1.1) E14476-01, May 2009, 172 pages.
"Oracle Complex Event Processing CQL Language Reference," 11g Release 1 (11.1.1) E12048-01, Apr. 2010, 540 pages.
"OSGI Service Platform Core Specification, The OSGI Alliance," Apr. 2007, ver. 4.1, release 4, 288 pages, OSGI Alliance.
"Release Notes," BEA WebLogic Event Server, Jul. 2007, ver. 2.0, 8 pages.
"Stanford Stream Data Manager," at URL: http://infolab.stanford.edu/stream/, last modified Jan. 5, 2006, pp. 1-9.
"Stream: The Stanford Stream Data Manager," IEEE Data Engineering Bulletin, Mar. 2003, pp. 1-8.
"StreamBase New and Noteworthy," StreamBase, dated Jan. 12, 2010, 878 pages.
"Understanding Domain Configuration," BEA WebLogic Server, Mar. 30, 2007, ver. 10.0, 38 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
"Coral8 Complex Event Processing Technology Overview," Coral8, Inc., Make it Continuous, pp. 1-8, Copyright 2007 Coral8, Inc.
Abadi, D., et al., "Aurora: A Data Stream Management System," International Conference on Management of Data, Proceedings of the 2003 ACM SIGMOD International Conference on Management of Data, ACM Press, 2003, 4 pages.
Aho, A. et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecturs Notes in Computer Science, 2004, vol. 2921/2004, pp. 1-19.
Arasu, A., et al., "The CQL Continuous Query Language: Semantic Foundations and Query Execution," Stanford University, The VLDB Journal—The International Journal on Very Large Data Bases, vol. 15, Issue 2, Springer-Verlag New York, Inc., Jun. 2006, pp. 1-32.
Arasu, et al., "An Abstract Semantics and Concrete Language for Continuous Queries over Streams and Relations," 9th International Workshop on Database programming languages, Sep. 2003, 12 pages.
Arasu, et al., "STREAM: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, Y., et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, ACM Press, Copyright 2006.
Bose, S. et al., "A Query Algebra for Fragmented XML Stream Data", 9th International Conference on Data Base Programming Languages (DBPL), Sep. 6-8, 2003, Postdam, Germany, at URL: http://lambda,uta.edu/dbp103.pdf, 11 pages.
Buza, "Extension of CQL over Dunamic Databases," Journal of Universial Computer Science, 2006, vol. 12, No. 9, pp. 1165-1176.
Carpenter, "User Defined Functions," Oct. 12, 2000, at URL:http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, p. 12.
Chen, J., et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
Conway, N., "An Introduction to Data Stream Query Processing," Truviso, Inc., May 24, 2007, 71 pages, downloaded from: http://neilconway.org/talks/stream_intro.pdf.

(56) References Cited

OTHER PUBLICATIONS

Demers, A. et al., "Towards Expressive Publish/Subscribe Systems," in Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
Deshpande, et al., "Adaptive Query Processing," slide show believed to be prior to Oct. 17, 2007, 27 pages.
Diao, Y. "Query Processing for Large-Scale XML Message Brokering", 2005, University of California Berkeley, 226 pages.
Diao, Y. et al. "Query Processing for High-Volume XML Message Brokering", Proceedings of the 29th VLDB Conference, Berlin, Germany, 2003, 12 pages.
Dindar, N., et al., "Event Processing Support for Cross-Reality Environments," Pervasive Computing, IEEE CS, Jul.-Sep. 2009, pp. 2-9, Copyright 2009 IEEE.
Esper Reference Documentation, Copyright 2007, ver. 1.12.0, 158 pages.
Esper Reference Documentation, Copyright 2008, ver. 2.0.0, 202 pages.
Fernandez, Mary et al., "Build your own XQuery processor", slide show, at URL: http://www.galaxquery.org/slides/edbt-summerschool2004.pdf, 2004, 116 pages.
Fernandez, Mary et al., Implementing XQuery 1.0: The Galax Experience:, Proceedings of the 29th VLDB Conference, Berlin, Germany, 2003, 4 pages.
Florescu, Daniela et al., The BEA/XQRL Streaming XQuery Processor, Proceedings of the 29th VLDB Conference, 2003, Berlin, Germany, 12 pages.
Gilani, A. Design and implementation of stream operators, query instantiator and stream buffer manager, Dec. 2003, 137 pages.
Golab, "Sliding Window Query Processing Over Data Streams," University of Waterloo, Waterloo, Ont. Canada, Aug. 2006, 182 pages.
Golab, L., et al., "Issues in Data Stream Management," ACM SIGMOD Record, vol. 32, Issue 2, Jun. 2003, ACM Press, pp. 5-14.
Gosling, et al., "The Java Language Specification," Book, copyright 1996-2005, 3rd edition, 684 pages, Sun Microsystems USA.
Hao et al. "Achieving high performance web applications by service and database replications at edge servers," proceedings of IPCCC 2009, IEEE 28th International Performance Computing and Communications Conference, pp. 153-160 (Dec. 2009).
Hopcroft, J. E., "Introduction to Automata Theory, Languages, and Computation," Second Edition, Addison-Wesley, Copyright 2001, 1-521 pages.
Jin, C. et al. "ARGUS: Efficient Scalable Continuous Query Optimization for Large-Volume Data Streams" 10th International Database Engineering and Applications Symposium (IDEAS'06), 2006, pp. 7.
Kawaguchi, Kohsuke, "Java Architecture for XML Binding (JAXB) 2.0 ", Sun Microsystems, Inc., Apr. 19, 2006, 384 pages.
Knuth, D. E., et al., "Fast Pattern Matching in Strings," Siam J. Comput., vol. 6, No. 2, Jun. 1977, pp. 323-350.
Lakshmanan, et al., "On efficient matching of streaming XML documents and queries," 2002, 18 pages.
Lindholm, T. and Yellin, F., "Java Virtual Machine Specification, 2nd Edition", Prentice Hall, Apr. 1999, 484 pages.
Liu, et al., "Efficient XSLT Processing in Relational Database System," Proceeding of the 32nd. International Conference on Very Large Data Bases (VLDB), Sep. 2006, 1106-1116, 11 pages.
Luckham, D., "What's the Difference Between ESP and CEP?" Complex Event Processing, downloaded Apr. 29, 2011, 5 pages, at URL: http://complexevents.com/?p=103.
Madden, et al., "Continuously Adaptive Continuous Queries (CACQ) over Streams," SIGMOD 2002, Jun. 4-6, 2002, 12 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Babcock et al., "Models and Issues in Data Streams," Proceedings of the 21st ACM SIGMOD-SIGACT-SIDART symposium on Principles of database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
Novick, "Creating a User Definded Aggregate with SQL Server 2005," at URL: http://novicksoftware.com/Articles/sql-2005-product-user-defined-aggregate.html, 2005, 6 pages.
Oracle Application Server 10g, Release 2 and 3, New Features Overview, an Oracle White Paper, Oct. 2005, 48 pages.
Oracle Application Server, Administrators Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, 10g Release 3 (10.1.3.2.0), B32201-01, Jan. 2007, 314 pages, Oracle.
Oracle Database, SQL Language Reference, 11g Release 1 (11.1), B28286-02, Sep. 2007, 1496 pages.
Oracle Database, SQL Reference, 10g Release 1 (10.1), Part No. B10759-01, Dec. 2003, pp. 7-1 to 7-17; 7-287 to 7-290; 14-61 to 14-74.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
Sadri, R., et al., "Expressing and Optimizing Sequence Queries in Database Systems," ACM Transactions on Database Systems, vol. 29, No. 2, Jun. 2004, pp. 282-318, ACM Press, Copyright 2004.
Sadtler, et al., "WebSphere Application Server Instalation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
Stolze, "User-defined Aggregate Functions in DB2 Universal Database," at URL: http://www.128.ibm.com/developerworks/db2/library/tacharticle/0309stolze/0309stolze.html, Sep. 11, 2003, 9 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
Terry, et al., "Continuous queries over append-only database," Proceedings of 1992 ACM SIGMOD, pp. 321-330.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
White, S., et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke, "XML Query," Mar. 14, 2004, 29 pages.
Non-Final Office Action for U.S. Appl. No. 12/548,290, mailed on Oct. 3, 2011.

(56) References Cited

OTHER PUBLICATIONS

Non-Final Office Action for U.S. Appl. No. 12/548,281, mailed on Oct. 3, 2011.
Non-Final Office Action for U.S. Appl. No. 12/534,398, mailed on Nov. 1, 2011.
Non-Final Office Action for U.S. Appl. No. 12/548,222, mailed on Oct. 17, 2011.
Non-Final Office Action for U.S. Appl. No. 12/548,187, mailed on Sep. 27, 2011.
Non-Final Office Action for U.S. Appl. No. 12/396,008, mailed on Jun. 8, 2011.
Notice of Allowance for U.S. Appl. No. 12/396,008, mailed on Nov. 16, 2011.
Non-Final Office Action for U.S. Appl. No. 12/395,871, mailed on May 27, 2011.
Final Office Action for U.S. Appl. No. 12/395,871, mailed on Oct. 19, 2011.
Non-Final Office Action for U.S. Appl. No. 11/874,202, mailed on Dec. 3, 2009.
Final Office Action for U.S. Appl. No. 11/874,202, mailed on Jun. 8, 2010.
Notice of Allowance for U.S. Appl. No. 11/874,202, mailed on Dec. 22, 2010.
Notice of Allowance for U.S. Appl. No. 11/874,202, mailed on Mar. 31, 2011.
Notice of Allowance for U.S. Appl. No. 11/874,850, mailed on Nov. 24, 2009.
Supplemental Notice of Allowance for U.S. Appl. No. 11/874,850, mailed on Dec. 11, 2009.
Supplemental Notice of Allowance for U.S. Appl. No. 11/874,850, mailed on Jan. 27, 2010.
Non-Final Office Action for U.S. Appl. No. 11/874,896, mailed on Dec. 8, 2009.
Final Office Action for U.S. Appl. No. 11/874,896, mailed on Jul. 23, 2010.
Non-Final Office Action for U.S. Appl. No. 11/874, 896, mailed on Nov. 22, 2010.
Notice of Allowance for U.S. Appl. No. 11/874,896, mailed on Jun. 23, 2011.
Non-Final Office Action for U.S. Appl. No. 11/977,439, mailed on Apr. 13, 2010.
Notice of Allowance for U.S. Appl. No. 11/977,439, mailed on Aug. 18, 2010.
Supplemental Notice of Allowance for U.S. Appl. No. 11/977,439, mailed on Sep. 28, 2010.
Notice of Allowance for U.S. Appl. No. 11/977,439, mailed on Nov. 24, 2010.
Notice of Allowance for U.S. Appl. No. 11/977,439, mailed on Mar. 16, 2011.
Non-Final Office Action for U.S. Appl. No. 11/977,437, mailed on Oct. 13, 2009.
Final Office Action for U.S. Appl. No. 11/977,437, mailed on Apr. 8, 2010.
Notice of Allowance for U.S. Appl. No. 11/977,440, mailed on Oct. 7, 2009.
Office Action for U.S. Appl. No. 11/874,197, mailed on Nov. 10, 2009.
Final Office Action for U.S. Appl. No. 11/874,197, mailed on Jun. 29, 2010.
Non-Final Office Action for U.S. Appl. No. 11/874,197, mailed on Dec. 22, 2010.
Final Office Action for U.S. Appl. No. 11/874,197, mailed on Aug. 12, 2011, 26 pp.
Non-Final Office Action for U.S. Appl. No. 11/873,407, mailed on Nov. 13, 2009.
Final Office Action for U.S. Appl. No. 11/873,407, mailed on Apr. 26, 2010.
Notice of Allowance for U.S. Appl. No. 11/873,407, mailed on Nov. 10, 2010.
Notice of Allowance for U.S. Appl. No. 11/873,407, mailed on Mar. 7, 2011.
Non-Final Office Action for U.S. Appl. No. 11/601,415, mailed on Sep. 17, 2008.
Final Office Action for U.S. Appl. No. 11/601,415, mailed on May 27, 2009.
Advisory Action for U.S. Appl. No. 11/601,415, mailed on Aug. 18, 2009.
Non-Final Office Action for U.S. Appl. No. 11/601,415, mailed on Nov. 30, 2009.
Final Office Action for U.S. Appl. No. 11/601,415, mailed on Jun. 30, 2010.
Non-Final Office Action for U.S. Appl. No. 11/927,681, mailed on Mar. 24, 2011.
Notice of Allowance for U.S. Appl. No. 11/927,681, mailed on Jul. 1, 2011.
Non-Final Office Action for U.S. Appl. No. 11/927,683, mailed on Mar. 24, 2011.
Final Office Action for U.S. Appl. No. 11/927,683, mailed on Sep. 1, 2011.
Notice of Allowance for U.S. Appl. No. 11/927,683, mailed on Nov. 9, 2011.
Non-Final Office Action for U.S. Appl. No. 10/948,523, mailed on Jan. 22, 2007.
Final Office Action for U.S. Appl. No. 10/948,523, mailed on Jul. 6, 2007.
Non-Final Office Action for U.S. Appl. No. 10/948,523, mailed Dec. 11, 2007.
Notice of Allowance for U.S. Appl. No. 10/948,523, mailed on Jul. 8, 2008.
Supplemental Notice of Allowance for U.S. Appl. No. 10/948,523, mailed on Aug. 25, 2008.
Notice of Allowance for U.S. Appl. No. 10/948,523, mailed on Dec. 1, 2010.
International Search Report dated for PCT/US2011/052019 (Nov. 17, 2011).
Notice of allowance U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
Office Action for U.S. Appl. No. 12/534384 (Feb. 28, 2012).
Office Action for U.S. Appl. No. 12/506,905 (Mar. 26, 2012).
Notice of Allowance for U.S. Appl. No. 13/184,528 (Mar. 1, 2012).
Office Action for U.S. Appl. No. 12/548,209 (Apr. 16, 2012).
U.S. Appl. No. 12/548,187, Final Office Action mailed on Jun. 10, 2013, 18 pages.
U.S. Appl. No. 12/548,222, Notice of Allowance mailed on Jul. 18, 2013, 12 pages.
U.S. Appl. No. 13/107,742, Final Office Action mailed on Jul. 3, 2013, 19 pages.
Notice of Allowance for U.S. Appl. No. 11/977,437 dated Jul. 10, 2013, 10 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
International Search Report dated Apr. 3, 2014 for PCT/US2014/010832, 9 pages.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).
U.S. Appl. No. 12/548,281, Final Office Action mailed on Oct. 10, 2013, 21 pages.
U.S. Appl. No. 12/548,290, Notice of Allowance mailed on Sep. 11, 2013, 6 pages.
U.S. Appl. No. 12/949,081, Final Office Action mailed on Aug. 27, 2013, 13 pages.
U.S. Appl. No. 13/089,556, Final Office Action mailed on Aug. 29, 2013, 10 pages.

(56) References Cited

OTHER PUBLICATIONS

U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 6 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 7, 2014, 9 pages.
Abadi et al., Aurora: a new model and architecture for data stream management, The VLDB Journal The International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal The International Journal on Very Large Data Bases, vol. 12, No. 2, Aug. 1, 2003, pp. 140-156.
Dewson, Beginning SOL Server 2008 for Developers: From Novice to Professional, A Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik und Informatik der Philipps-Universitat, Marburg, Germany, 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report and Written Opinion mailed on Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., Leo—DB2's Learning Optimizer, Proc. of the VLDB, Roma, Italy, Sep. 2001, pp. 19-28.
U.S. Appl. No. 13/838,259, filed Mar. 15, 2013, Deshmukh et al.
U.S. Appl. No. 13/839,288, filed Mar. 15, 2013, Deshmukh et al.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/396,464, Non-Final Office Action mailed on Sep. 7, 2012, 18 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 5 pages.
International Application No. PCT/US2012/036353, International Preliminary Report on Patentability mailed on Nov. 28, 2013, 6 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With Match_Recognize, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
U.S. Appl. No. 11/601,415, Non-Final Office Action mailed on Dec. 11, 2013, 58 pages.
U.S. Appl. No. 12/396,464, Non Final Office Action mailed on Dec. 31, 2013, 58 pages.
U.S. Appl. No. 13/089,556, Non-Final Office Action Jan. 9, 2014, 14 Pages.
Non-Final Office Action for U.S. Appl. No. 12/548,187 dated Feb. 6, 2014, 53 pages.
Agrawal et al. "Efficient pattern matching over event streams," Proceedings of the 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3, Issue 1-2, Sep. 2010, pp. 220-231.
Chapple "Combining Query Results with the Union Command," ask.com Computing Databases, downloaded from: http://databases.about.com/od/sql/a/union.htm (no date, printed on Oct. 14, 2013).
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
International Patent Application No. PCT/US2012/034970, International Preliminary Report on Patentability mailed on Nov. 21, 2013, 7 pages.
Pradhan, Implementing and Configuring SAP® Event Management, Galileo Press, 2010, pp. 17-21.
Wilson et al., SAP Event Management, an Overview, Q Data USA, Inc., 2009.

(56) References Cited

OTHER PUBLICATIONS

Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.

Tho et al. "Zero-latency data warehousing for heterogeneous data sources and continuous data streams," 5th International Conference on Information Integrationand Web-based Applications Services (Sep. 2003) 12 pages.

"SQL Subqueries"—Dec. 3, 2011, 2 pages.

"Caching Data with SqiDataSource Control"—Jul. 4, 2011, 3 pages.

"SCD—Slowing Changing Dimensions in a Data Warehouse"—Aug. 7, 2011, one page.

Non-Final Office Action for U.S. Appl. No. 13/838,259 dated Oct. 24, 2014, 21 pages.

Non-Final Office Action for U.S. Appl. No. 13/827,631 dated Nov. 13, 2014, 10 pages.

Non-Final Office Action for U.S. Appl. No. 13/827,987 dated Nov. 6, 2014, 9 pages.

Non-Final Office Action for U.S. Appl. No. 11/601,415 dated Oct. 6, 2014, 18 pages.

Non-Final Office Action for U.S. Appl. No. 14/077,230 dated Dec. 4, 2014, 30 pages.

Non-Final Office Action for U.S. Appl. No. 13/828,640 dated Dec. 2, 2014, 11 pages.

Non-Final Office Action for U.S. Appl. No. 13/830,428 dated Dec. 5, 2014, 23 pages.

Non-Final Office Action for U.S. Appl. No. 13/830,502 dated Nov. 20, 2014, 25 pages.

Non-Final Office Action for U.S. Appl. No. 13/839,288 dated Dec. 4, 2014, 30 pages.

\* cited by examiner

| Input Data: | Relation at time (T): | Output Stream T: |
|---|---|---|
| 1000: 5 | {5} | +5 |
| 1000: 6 | {5, 6} | +6 |
| 1000: 7 | {5, 6, 7} | +7 |
| 1001: 5 | {5, 6, 7, 5} | - |
| 1001: 6 | {5, 6, 7, 5, 6} | - |
| 1001: 7 | {5, 6, 7, 5, 6, 7} | - |
| 1001: 8 | {5, 6, 7, 5, 6, 7, 8} | +8 |
| 1002: 5 | {5, 6, 7, 5, 6, 7, 8, 5} | - |
| 1003: -5, -5, -5 | {6, 7, 6, 7, 8} | - |
| 1003: -6, -6 | {7, 7, 8} | - |
| 1003: -7, -7, 8 | {} | - |
| 1004: 5 | {5} | +5 |

Figure 4

SUPPORT FOR A NEW INSERT STREAM (ISTREAM) OPERATION IN COMPLEX EVENT PROCESSING (CEP)

BACKGROUND OF THE INVENTION

Typically, Complex Event Processing (CEP) is an approach that aggregates information from distributed message-based systems, databases, and applications in real-time and dynamically applies rules to discern patterns and trends that may otherwise go unnoticed. This may give companies the ability to identify and even anticipate exceptions and opportunities represented by seemingly unrelated events across highly complex, distributed, and heterogeneous environments. CEP is also used to correlate, aggregate, enrich, and detect patterns in high speed streaming data in near real time. Furthermore, CEP supports streaming of unbounded data through the notion of a stream. A stream is an unbounded collection of data items and in contrast, a selection is a finite collection of data items—much like in a traditional database system. Presently, there exist various operators that convert from a stream to a relation and vice versa.

Furthermore, ISTREAM (or insert stream) is one of the operators that converts a relation to a stream. ISTREAM calculates a multiset difference of a relation as a function of time $R(t)$ and $R(t-1)$ taking into account all columns of a relation. As such, because all columns are taken into account, the output data may include information which is unnecessary or unwanted. Hence, these and other shortcomings in the art are remedied by the present invention.

BRIEF DESCRIPTION OF THE DRAWINGS

The present invention is described in conjunction with the appended figures:

FIG. 4 is a diagram illustrating a table related to the processing of streaming data according to embodiments of the present invention;

Figure 1:
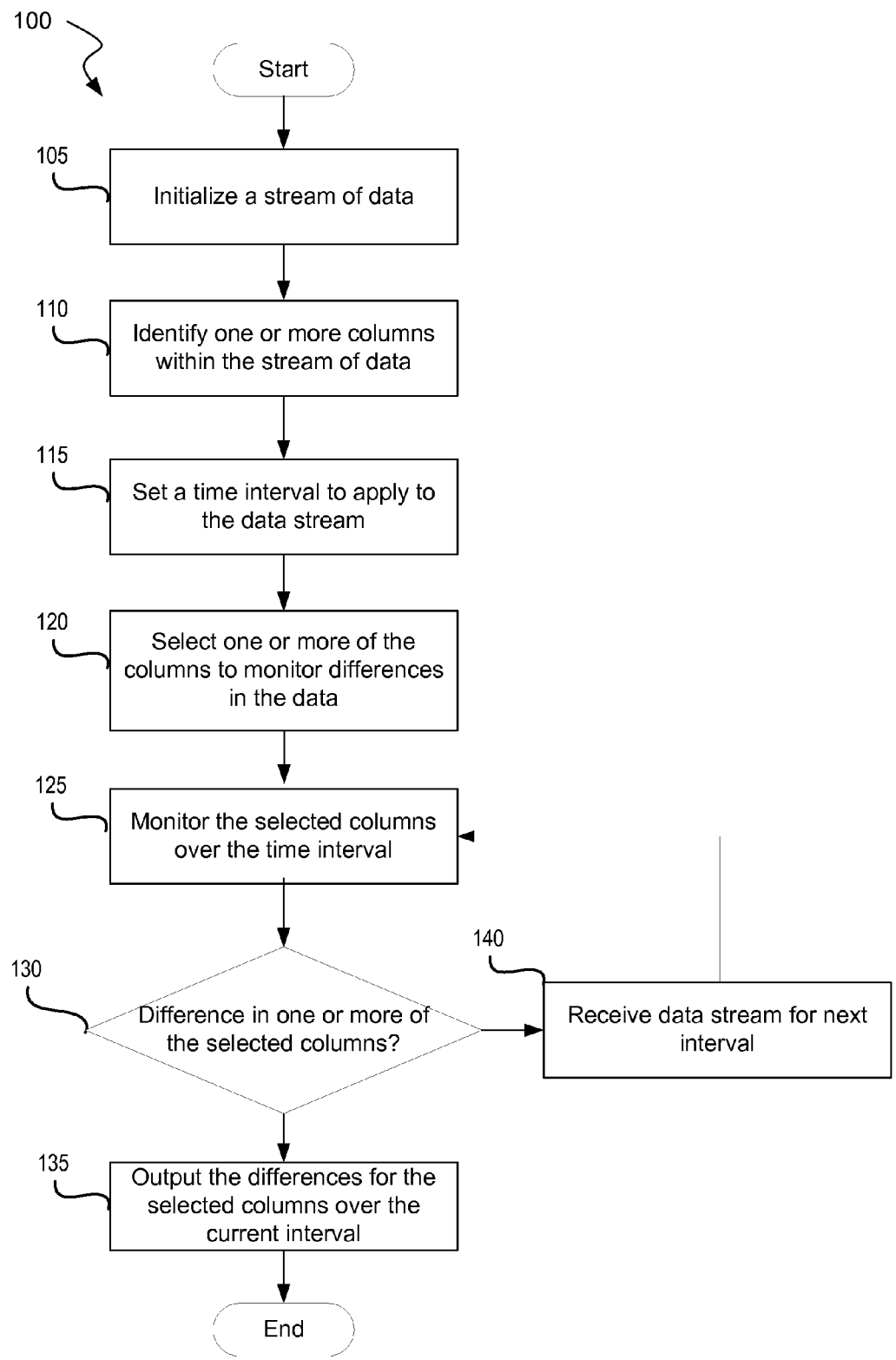
FIG. 1 is a flow diagram illustrating processing of streaming data according to embodiments of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

SUMMARY OF THE INVENTION

One embodiment of the invention includes a method of processing streaming data. The method includes initializing a stream of data and setting a time interval to apply to the stream of data. The time interval comprises a window for analyzing the data within the stream of data. The method further includes identifying one or more columns within the stream of data, designating one or more of the columns to be monitored for differences within the data over the time interval, and monitoring the designated columns over the time interval. Further, the method includes determining that at least one value from at least one of the designated columns has changed and in response to at least one value changing, outputting the changed values from the designated columns.

In yet another embodiment, a system for processing streaming data, is described. The system includes a storage memory having sets of instructions stored thereon and a processor coupled with the storage memory. The sets of instructions when executed by the processor, cause the processor to: initialize a stream of data, and set a time interval to apply to the stream of data. The time interval comprises a window for analyzing the data within the stream of data. The instructions further cause the processor to identify one or more columns within the stream of data, designate one or more of the columns to be monitored for differences within the data over the time interval, monitor the designated columns over the time interval, determine that at least one value from at least one of the designated columns has changed, and in response to at least one value changing, output the changed values from the designated columns.

A further embodiment of the invention includes a computer-readable medium for processing streaming data. The computer-readable medium includes instructions for initializing a stream of data and setting a time interval to apply to the stream of data. The time interval comprises a window for analyzing the data within the stream of data. The computer-readable medium further includes instructions for identifying one or more columns within the stream of data, designating one or more of the columns to be monitored for differences within the data over the time interval, and monitoring the designated columns over the time interval. Further, the computer-readable medium includes instructions for determining that at least one value from at least one of the designated columns has changed and in response to at least one value changing, outputting the changed values from the designated columns.

DETAILED DESCRIPTION OF THE INVENTION

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Aspects of the present invention relate to the concept that quite often some column values (or derived values) of tuples change between two consecutive instances of time (i.e., t and t+1), whereas other column values do not change. There may be situations where an application is interested in changes to only a subset of columns; however, ISTREAM currently considers all columns, and reports tuples even when the values (or derived values) of columns of interest do not change. As such, changes in data which are not of interest to the application may be outputted.

To this end, aspects of the present invention provide ISTREAM that not only consider a subset of columns, but also include new semantics, such as NOT IN semantics. Queries can be quite complex, and since ISTREAM actually works on a relation materialized from the execution of a query, aspects of the present invention can also apply the aforementioned logic to SELECT list expressions and apply it to a subset thereof. Applying an ISTREAM operator on a subset of columns with NOT IN semantic provides a convenient syntactic notation to express the output in a succinct manner.

Now, considering the following query:

```
CREATE QUERY q0 AS
ISTREAM
```

```
(
SELECT * FROM S [RANGE 1 NANOSECONDS]
)
DIFFERENCE USING (c1, c2)
```

This actually can lead to non-deterministic output (i.e., which tuple (and hence column values for c3) to pick and which one to leave out). Another alternative is to allow only columns or expressions based on columns specified in USING clause:

or

```
CREATE QUERY q0 AS
ISTREAM
(
SELECT c1, c2, func(c1,c2) FROM tkdata1_S [RANGE 1 NANOSECONDS]
)
DIFFERENCE USING (c1, c2)
CREATE QUERY tkdata1_q1 AS
ISTREAM
(
SELECT func(c1,c2) FROM tkdata1_S [RANGE 1 NANOSECONDS]
)
DIFFERENCE USING (c1, c2)
```

However, these expressions are too restrictive to be of any use. Hence, aspects of the present invention may utilize NOT IN (this is same as MINUS semantics except that the MINUS works strictly on a set, whereas the present invention allows for multiset/bag), which precisely results in the desired behavior without any of the aforementioned restrictions. Accordingly, with the given semantics, the output may be as follows for the following query and given input stream:

Query:

| CREATE QUERY q0 AS ISTREAM (SELECT c1 FROM S [RANGE 1 NANOSECONDS]) DIFFERENCE USING (c1) [or (1)] |||
| --- | --- | --- |
| Input: | Relation(t) | Output |
| 1000: 5 | {5} | +5 |
| 1000: 6 | {5, 6} | +6 |
| 1000: 7 | {5, 6, 7} | +7 |
| 1001: 5 | {5, 6, 7, 5} | — |
| 1001: 6 | {5, 6, 7, 5, 6} | — |
| 1001: 7 | {5, 6, 7, 5, 6, 7} | — |
| 1001: 8 | {5, 6, 7, 5, 6, 7, 8} | +8 |
| 1002: 5 | {5, 6, 7, 5, 6, 7, 8, 5} | — |
| 1003: −5, −5, −5 | | |
| 1003: −6, −6 | | |
| 1003: −7, −7, 8 | { } | |
| 1004: 5 | {5} | +5 |

In one embodiment, the expressions in the using clause can be specified by using number positions (1 . . . N), which refer to positions of select expressions or using attributes, like c1,c2, which refer to aliases in select list. If select list contains a complex expression, then it may be appropriately aliased as the USING clause does not allow expressions to be specified.

A further aspect of the present invention includes the following algorithm. For example, let the timestamp of stream elements which belong to T (i.e., where T is a discrete ordered time domain). The following describes one implementation and algorithm in abstract terms.

```
public istream ( ) {
    /* constructor initializes various data structures used by the
    operator */
    public istream( );
    /* relation synopsis: captures the relation as of time t−1, i.e.
    R(t−1). */
    private synopsis relsyn;
    /* synopsis to capture simultaneous tuples, i.e tuples with the same
    timestamp */
    private synopsis nowsyn;
    /* list of tuple qualified for output */
    private List nowList;
    /* setup an index on relsyn above on expression of interest for faster
    lookup */
    private index relidx;
    /* setup an index on relsyn above on expression of interest for faster
    lookup */
    private index nowidx;
    /* retrieve the next tuple from the queue.
     * if its timestamp is greater than that of last one, i.e. time has
     advanced:
         * - drain the now list (nowList) and output all tuples therein.
         * - update relsyn by inserting tuples in nowsyn.
         *
         * Depending on the type of the tuple call handlePlus or
         handleMinus method
         */
    public void getTuple( );
    /* if tuple exists in relsyn, discard it, i.e. it exists in R(t−1).
         * - insert it into nowsyn (to update relsyn later)
         * else
         * - insert it into nowList, nowSyn
     */
    public void handlePlus(Tuple t);
         /* ISTREAM by definition does not output negative tuples.
         * - insert into nowSyn, if a corresponding +ve tuple is found
            decrement
refcount.
         * if refcount is zero, delete it from nowSyn.
         * - if a +ve tuples exists in nowList, decrement refcount, delete
            if refcount is
         * 0.
         */
    public void handleMinus(Tuple t);
}
```

Some possible advantage of the present invention may be that users are allowed to declaratively and succinctly specify complex logic involving multiset not in semantics. Such functionality may be completely and seamlessly integrated into, for example, a declarative framework within a server without requiring users to write a lot of code and/or resort to expensive operations, such as RSTREAM. The present invention may also be memory optimized. Most users have events with a large number of fields, but only a subset of them are of interest. In such situations the ISTREAM multiset except semantics (previous behavior) may not only be expensive but also undesirable. Furthermore, it may not be possible to combine other current contextual query language (CQL) constructs to come up with semantics (multiset NOT IN), which are supported by the present invention. Furthermore, this new variant of the ISTREAM operator provides users the additional flexibility in designing applications when interested only in a subset of SELECT expressions, with deterministic semantics, significant performance improvement by eliminating events of non-interest, etc.

CQL Terminology:

Streams: A stream is the principal source of data that Oracle CQL queries act on. Stream S is a bag multi-set of elements (s,T) where s is in the schema of S and T is in the time domain. Stream elements are tuple-timestamp pairs, which can be represented as a sequence of timestamped tuple insertions. In other words, a stream is a sequence of timestamped tuples. There could be more than one tuple with the same timestamp. The tuples of an input stream are required to arrive at the system in the order of increasing timestamps. A stream has an associated schema consisting of a set of named attributes, and all tuples of the stream conform to the schema.

Time: Timestamps are an integral part of an Oracle CEP stream. However, timestamps do not necessarily equate to clock time. For example, time may be defined in the application domain where it is represented by a sequence number. Timestamps need only guarantee that updates arrive at the system in the order of increasing timestamp values. Note that the timestamp ordering requirement is specific to one stream or a relation. For example, tuples of different streams could be arbitrarily interleaved. Oracle CEP can observe application time or system time.

For system timestamped relations or streams, time is dependent upon the arrival of data on the relation or stream data source. Oracle CEP generates a heartbeat on a system timestamped relation or stream if there is no activity (no data arriving on the stream or relation's source) for more than a specified time: for example, 1 minute. Either the relation or stream is populated by its specified source or Oracle CEP generates a heartbeat every minute. This way, the relation or stream can never be more than 1 minute behind. For system timestamped streams and relations, the system assigns time in such a way that no two events will have the same value of time. However, for application timestamped streams and relations, events could have the same value of time.

Tuple Kind: CEP tuple kind indicators are: + for inserted tuple, − for deleted tuple. It should be noted that these terms are merely provided for clarity and other definitions and interpretations of these terms may be used as is known by one of ordinary skill in the art.

Turning now to FIG. 1, which illustrates a method 100 of processing streaming data, according to embodiments of the present invention. At process block 105, a data stream may be initialized. In one embodiment, the stream may be associated with a particular application or set of applications. Further, the stream may be a CEP stream or the like. Furthermore, the streaming data may include tables which in turn include columns and/or fields. The streaming data may also be stored in one or more databases.

At process block 110, one or more of the columns within the stream of data may be identified as columns of "interest". In one embodiment, the columns of interest may be columns for which the application (or the user) is interested in changes that occur to the data within the columns. Furthermore, a time interval for processing the data stream may be associated with the stream of data (process block 115). For example, the time interval may be 1 nanosecond, 10 nanoseconds, 1 millisecond, 10 milliseconds, etc., and the time interval may provide a window for analyzing the data within the stream of data. In one embodiment, the window may provide a relation for creating the table within the stream of data. The table may be populated with data from the stream within the window (i.e., within the time interval).

At process block 120, one or more of the columns within the table may be selected for monitoring differences within the data included in the columns. For example, if a table includes ten columns A-J and columns A and C are selected to be monitored, then the query will only generate output when changes to either column A or C occur. As such, the output will contain information with is considered relevant to the user and/or application.

Accordingly, the selected columns are monitored for changes over the time interval (process block 125). If changes occur (decision block 130), then the differences for the selected column(s) are outputted for the current time interval (process block 135). Alternatively, if no changes occur in the data within the selected column(s), then the selected column(s) is continued to be monitored for subsequent time intervals for the duration of the data stream (process block 140).

One example of an implementation of method 100 may be with regard to traffic data. A stream of traffic data for a given car driving on the highway may include a number of variables (e.g., speed, location, time, segment, etc.). Each of these variables may be translated into columns within a table, and the data within the columns may change continuously. However, only certain changes in the data may be of use to an application. In one embodiment, the application is a toll application which charges tolls based on segments of a road traveled. A such, it may only be valuable to the application to know when the car has traveled from one segment of the highway to another.

Thus, changes in speed, for example, may not be worth outputting. Additionally, it is likely that changes in speed occur within nearly every time interval. Likewise, time and location may not be worth outputting changes, but changes in segment may be worth outputting. As such, as the car moves on the highway, the location (or coordinates) are monitored to determine if the current segment has changed. Thus, if the location changes from a location within one segment to a location within another segment, such a change will be outputted. Accordingly, in this example, the toll application can calculate an additional toll amount based on the segment change, while ignoring the changes in speed, time, and location.

Figure 2:
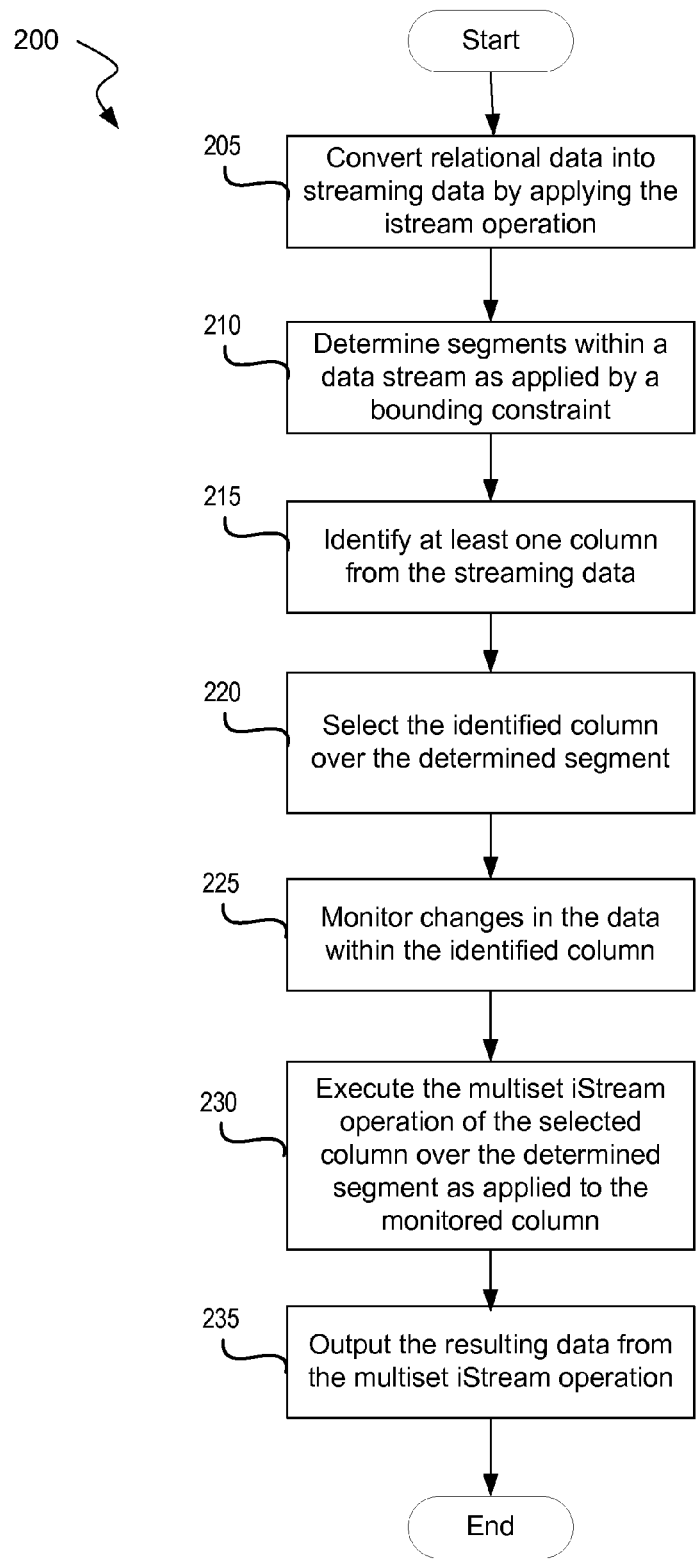
FIG. 2 is a flow diagram illustrating processing of streaming data according to further embodiments of the present invention.

Referring now to FIG. 2, which illustrates a method 200 of processing streaming data, according to embodiments of the present invention. At process block 205, relational data may be converted into streaming data by applying the ISTREAM operation. Then, based on the streaming data as applied to a bounding constraint, segments within the data stream may be determined (process block 210).

At process block 215, at least one column within the data stream may be identified as including data in which an application is interested in viewing changes. At process block 220, the identified column is selected over the determined segment. Changes to the data within the identified column may then be monitored (process block 225). At process block 230, the multiset ISTREAM operation of the selected column over the determined segment as applied to the monitored column is executed. As such, the resulting data from the mutiset ISTREAM operation only includes change data to the columns of interest and such changes are then outputted (process block 235).

Figure 3:
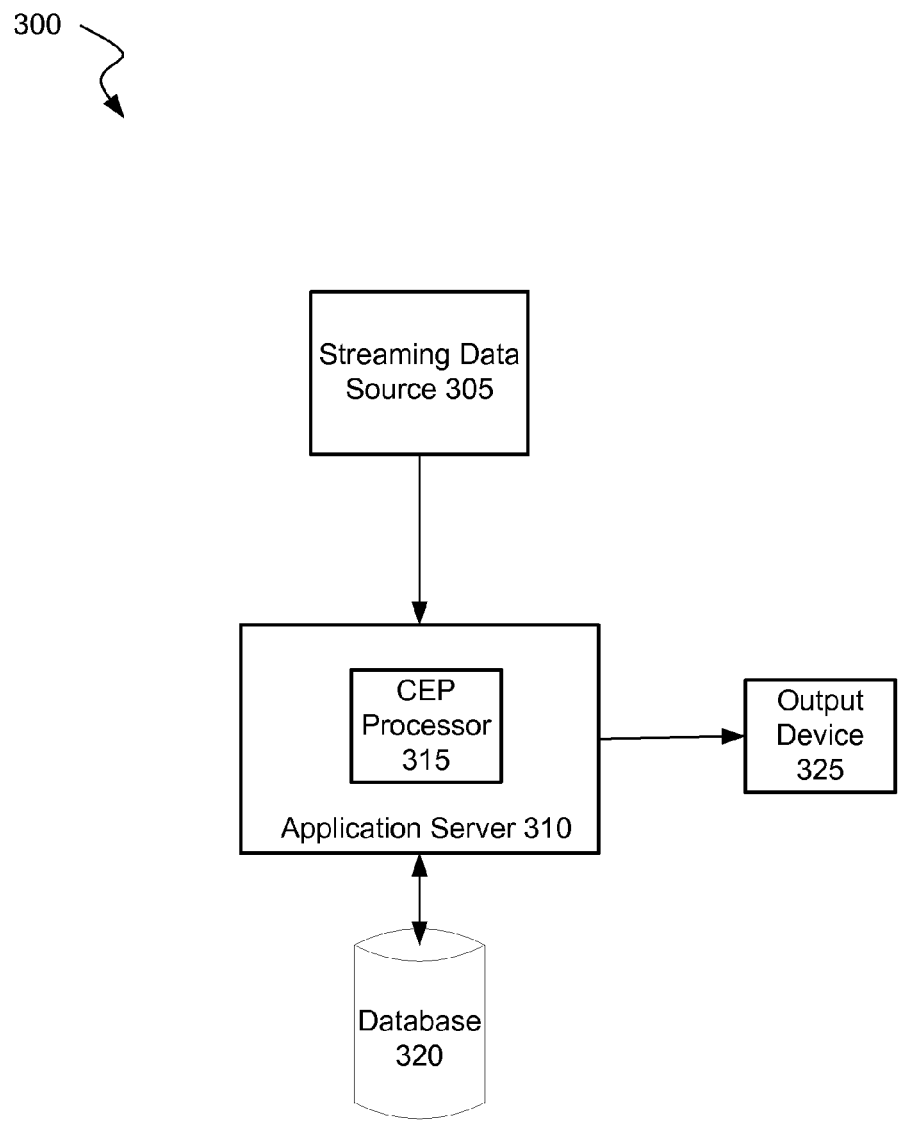
FIG. 3 is a block diagram illustrating a system for processing streaming data according to embodiments of the present invention.

FIG. 3 is a block diagram illustrating a system 300 for processing streaming data according to embodiments of the present invention. In one embodiment, system 300 includes a streaming data source 305. The streaming data source 305 may be in communication with an application server 310 which includes a CEP processor 315. In one embodiment, CEP processor 315 may be configured to implement methods 100 and 200 from FIGS. 1 and 2. Furthermore, application server 310 may be in communication with a database 320 and an output device 325. In one embodiment, database 320 may store the data from the streaming data source 305, and output device 325 may be used to display the resulting changes to the monitored data. Furthermore, database 320 may be remotely located from the application server 310 or co-located with the application server 310.

Turning now to FIG. 4, a table related to the processing of streaming data is illustrated, according to embodiments of the present invention. The following query may be used to generate the result table of FIG. 4:

```
CREATE QUERY q0 AS
    ISTREAM (SELECT c1 FROM S [RANGE 1 NANOSECONDS])
DIFFERENCE USING (c1) [or (1)].
```

As such, at timestamp 1000, the output would be '5' based on the change which occurred within the interval. At timestamp 1000, the output would be '6' based on the change which occurred within the interval. Similarly, at timestamp 1000, the output would be '7' based on the changes within the interval. Interval 1001 would not have any output due to the fact that '5', '6', and '7' were already included within the data set. At timestamp 1001, '8' would be the output due to the change.

Intervals 1003 and 1004 would not include any output due to the fact that '5' is not a change and the remainder of the intervals include a removal. Subsequently, at timestamp 1004, since '5' was removed from the data set, the addition of '5' is not outputted because it is not a change to the data set.

In one embodiment, nothing is output until there is progression of time. This may be due to the fact that another −ve tuple can come at the same timestamp that has not been seen, thus canceling out the +ve which is already seen. Thus, the output should be at one timestamp later, but still propagating the timestamp at which it was seen. (It may be there in the form of a hidden column of an element time, but some applications may choose to ignore it.)

Figure 5:
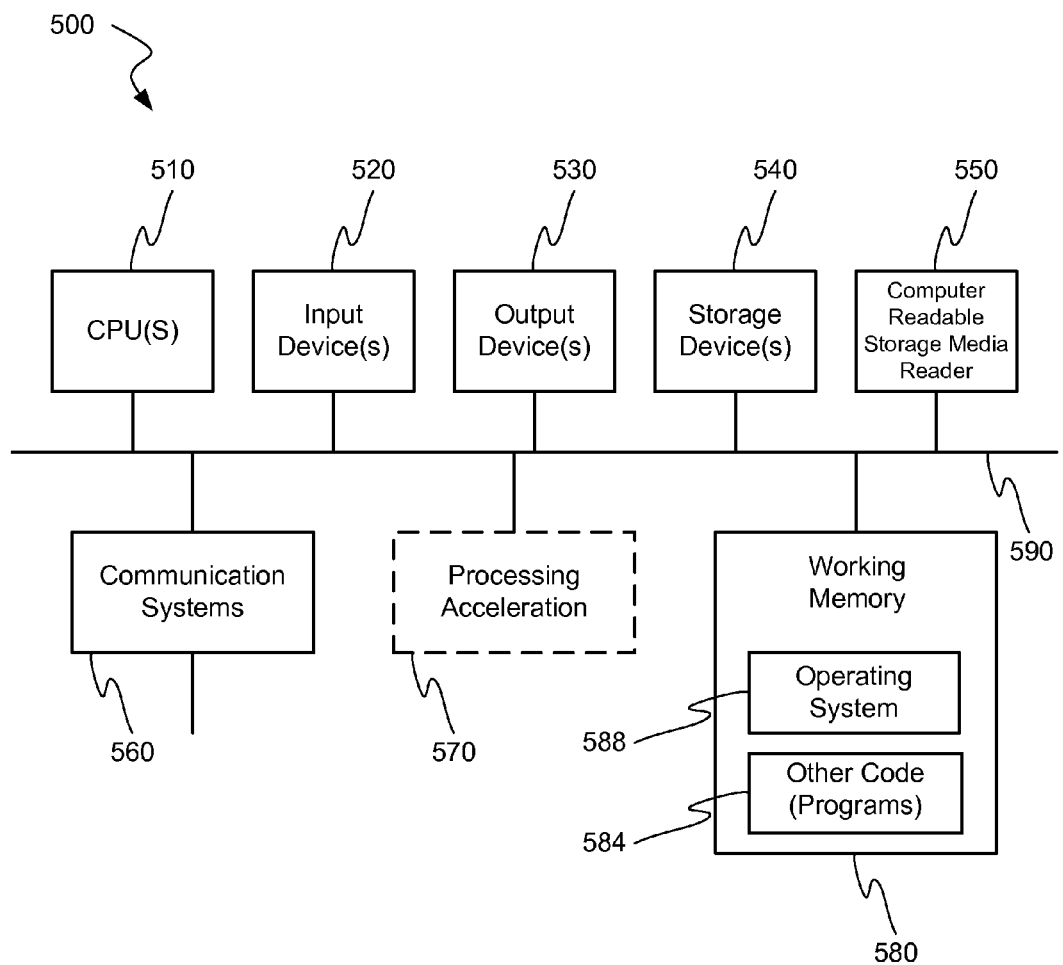
FIG. 5 is a block diagram of an exemplary computer system capable of being used in at least some portion of the apparatuses or systems of the present invention, or implementing at least some portion of the methods of the present invention.

FIG. 5 is a block diagram illustrating an exemplary computer system 500 in which embodiments of the present invention may be implemented. The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device(s) 540. By way of example, storage device(s) 540 may be disk drives, optical storage devices, a solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 588 and/or other code 584. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 584 for implementing any or all of the functions of the various elements of the architecture as described herein. For example, software, stored on and/or executed by a computer system such as system 500, can provide the functionality and/or other components of the invention such as those discussed above. Methods implementable by software on some of these components have been discussed above in more detail.

Figure 6:
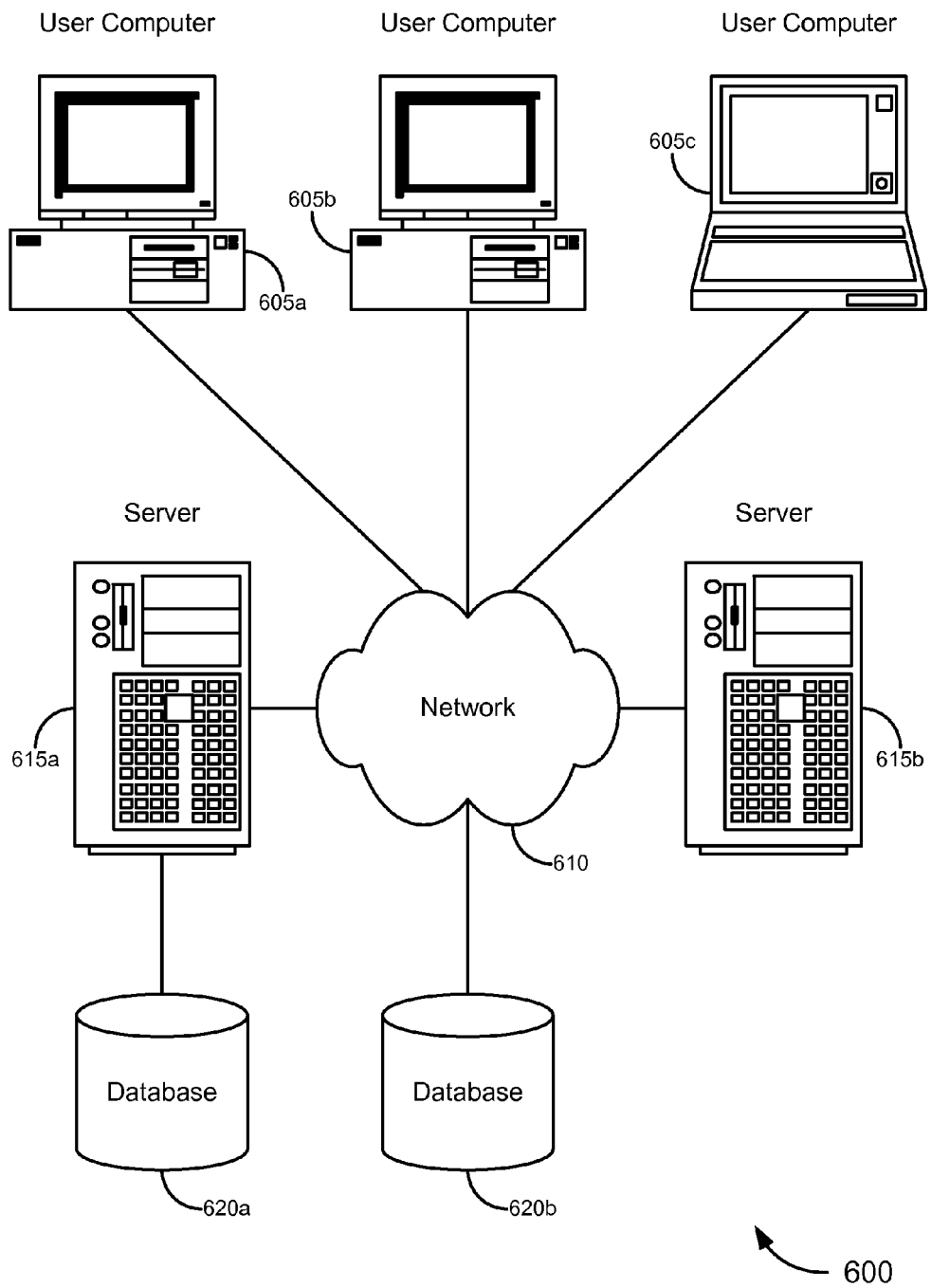
FIG. 6 is a block diagram illustrating an exemplary networking system for implementing embodiments of the present invention.

Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more user computers 605 and/or other server computers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the user computers 605 and/or other server computers 615. Merely by way of example, the server computers 615 can be one or more general purpose computers capable of executing programs or scripts in response to the user computers 605 and/or other server computers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 605 and/or another server computer 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more server computers 615 can function as a file server and/or can include one or more of the files (e.g., application code, data files, etc.) necessary to implement methods of the invention incorporated by an application running on a user computer 605 and/or another server computer 615. Alternatively, as those skilled in the art will appreciate, a file server can include all necessary files, allowing such an application to be invoked remotely by a user computer 605 and/or server computer 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more database(s) 620. The location of the database(s) 620 is discretionary. Merely by way of example, a database 620a might reside on a storage medium local to (and/or resident in) a server computer 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

The invention has now been described in detail for the purposes of clarity and understanding. However, it will be appreciated that certain changes and modifications may be practiced within the scope of the appended claims.

What is claimed is:

1. A method of processing streaming data, the method comprising:

initializing, by a computer processor, a stream of data for a continuous query logic (CQL) operation;

setting, by the computer processor, a time interval of the CQL operation to apply to the stream of data, wherein the time interval comprises a window for analyzing the data within the stream of data;

identifying, by the computer processor, one or more columns within the stream of data;

designating, by the computer processor in the CQL operation, one or more of the columns to be monitored for differences within the data over the time interval by executing a SELECT list expressions and applying the SELECT list expressions to a subset of the stream of data, wherein the one or more designated column are columns of interest;

monitoring, by the computer processor, the designated columns over the time interval of the CQL operation;

determining, by the computer processor, that at least one value from at least one of the designated columns has changed by applying an ISTREAM operator of the CQL operation on a subset of the one or more columns with a NOT IN semantic to provide a syntactic notation to express output, wherein the ISTREAM operator currently considers all of the one or more columns and reports tuples even when values of the one or more columns of interest do not change and further outputs changes in values in the one or more columns which are not columns of interest; and in response to at least one value changing, outputting, by the computer processor, the changed values from the designated columns using the syntactic notation of the CQL operation and outputting changes in data in the one or more columns which are not columns of interest.

2. The method of processing streaming data as in claim 1, further comprising continuing to receive data from the stream of data for a next time interval.

3. The method of processing streaming data as in claim 2, wherein the receiving of the data from the stream of data is substantially in real-time.

4. The method of processing streaming data as in claim 1, wherein the one or more columns are included in one or more tables constructed from the stream of data over the time interval.

5. The method of processing streaming data as in claim 1, wherein the output only includes changes within the stream of data.

6. The method of processing streaming data as in claim 1, wherein the processing of the streaming data comprises complex event processing (CEP).

7. The method of processing streaming data as in claim 1, wherein the output comprises a subset of data within the streaming data which has changed over the time interval.

8. A non-transitory computer-readable medium for processing streaming data having sets of instructions stored thereon which, when executed by a computer, cause the computer to:

convert relational data into streaming data by applying an istream operator of a continuous query logic (CQL) operation;

determine one or more segments within the streaming data as applied by a bounding constraint, wherein the bounding constraint designates segment boundaries of the CQL operation;

identify a column from the data stream for the CQL operation;

select the identified column over the determined segment;

select a column to monitor changes in the data within the column over the determined segment by executing a single SELECT list expressions and applying the single SELECT list expressions to a subset of the stream of data for the CQl operation;

monitoring the designated columns over a time interval of the CQL operation, wherein the designated column are columns of interest;

determining that at least one value from at least one of the designated columns has changed by applying an istream operator of the CQL operation on a subset of the one or more columns with a NOT IN semantic to provide a syntactic notation to express output, wherein the ISTREAM operator currently considers all of the columns and reports tuples even when values of the columns of interest do not change and further outputs changes in values in the columns which are not columns of interest;

execute a multiset istream operation of the CQL operation of the selected column over the determined segment as applied to the monitored column; and in response to at least one value changing, output the resulting data from the multiset istream operation using the syntactic notation of the CQL operation and output changes in data in the columns which are not columns of interest.

9. The non-transitory computer-readable medium for processing streaming data as in claim 8, wherein the sets of instructions when further executed by the computer, cause the computer to convert the streaming data back into relational data.

10. The non-transitory computer-readable medium for processing streaming data as in claim 8, wherein the segment boundaries comprise a time interval.

11. The non-transitory computer-readable medium for processing streaming data as in claim 10, wherein the time interval comprises a time window for analyzing changes within the designated column data.

12. The non-transitory computer-readable medium for processing streaming data as in claim 10, wherein the output comprises a subset of data within the data stream which has changed over the segment.

13. A system for processing streaming data, the system comprising:

a storage memory having sets of instructions stored thereon; and a processor coupled with the storage memory, wherein the sets of instructions when executed by the processor, cause the processor to:

initialize a stream of data for a continuous query logic (CQL) operation;

set a time interval to apply to the stream of data of the CQL operation, wherein the time interval comprises a window for analyzing the data within the stream of data;
identify one or more columns within the stream of data;
designate in the CQL operation one or more of the columns to be monitored for differences within the data over the time interval by executing a SELECT list expressions and applying the SELECT list expressions to a subset of the stream of data, wherein the one or more designated column are columns of interest;
monitor the designated columns over the time interval of the CQL operation;
determine that at least one value from at least one of the designated columns has changed by applying an ISTREAM operator if the CQL operation on a subset of the one or more columns with a NOT IN semantic to provide a syntactic notation to express output, wherein the ISTREAM operator currently considers all of the one or more columns and reports tuples even when values of the one or more columns of interest do not change and further outputs changes in values in the one or more columns which are not columns of interest; and
in response to at least one value changing, output the changed values from the designated columns using the syntactic notation of the CQL operation and output changes in data in the one or more columns which are not columns of interest.

14. The system for processing streaming data as in claim 13, further comprising a database, wherein the database is configured to store the data within the stream of data.

15. The system for processing streaming data as in claim 14, wherein the sets of instructions further cause the processor to continue to receive data from the stream of data for a next time interval.

16. The system for processing streaming data as in claim 15, wherein the receiving of the data from the stream of data is substantially in real-time.

17. The system for processing streaming data as in claim 13, wherein the one or more columns are included in one or more tables constructed from the stream of data over the time interval.

18. The system for processing streaming data as in claim 13, wherein the output only includes changes within the stream of data over the time interval.

19. The system for processing streaming data as in claim 13, wherein the processor is configured to implement a monitoring application which implements the sets of instructions executed by the processor.

20. The method for processing streaming data as in claim 13, wherein the processing of the streaming data comprises complex event processing (CEP).

* * * * *

UNITED STATES PATENT AND TRADEMARK OFFICE
CERTIFICATE OF CORRECTION

PATENT NO. : 8,990,416 B2
APPLICATION NO. : 13/102665
DATED : March 24, 2015
INVENTOR(S) : Shukla et al.

Page 1 of 1

It is certified that error appears in the above-identified patent and that said Letters Patent is hereby corrected as shown below:

References Cited

In page 5, under other publications, column 2, line 27, delete "Lecturs" and insert -- Lectures --, therefor.

In page 5, under other publications, column 2, line 54, delete "Postdam," and insert -- Potsdam, --, therefor.

In page 5, under other publications, column 2, line 56, delete "Dunamic" and insert -- Dynamic --, therefor.

In page 5, under other publications, column 2, line 57, delete "Universial" and insert -- Universal --, therefor.

In page 6, under other publications, column 2, line 11, delete "Definded" and insert -- Defined --, therefor.

In the Specification

In column 7, line 47, delete "mutiset" and insert -- multiset --, therefor.

In the Claims

In column 12, line 20, in claim 8, delete "CQI" and insert -- CQL --, therefor.

In column 14, line 23, in claim 20, delete "The method" and insert -- The system --, therefor.

Signed and Sealed this
Third Day of November, 2015

Michelle K. Lee
*Director of the United States Patent and Trademark Office*